(12) United States Patent
Park et al.

(10) Patent No.: US 10,549,612 B2
(45) Date of Patent: Feb. 4, 2020

(54) TILTING SUNROOF STRUCTURE

(71) Applicants: Hyundai Motor Company, Seoul (KR); Kia Motors Corporation, Seoul (KR); Webasto Donghee Holdings, Ulsan (KR)

(72) Inventors: Jeong Hoon Park, Suwon-si (KR); Su Yun Choi, Ulsan (KR)

(73) Assignees: Hyundai Motor Company, Seoul (KR); Kia Motors corporation, Seoul (KR); Webasto Donghee Holdings, Ulsan (KR)

( * ) Notice: Subject to any disclaimer, the term of this patent is extended or adjusted under 35 U.S.C. 154(b) by 0 days.

(21) Appl. No.: 16/119,160

(22) Filed: Aug. 31, 2018

(65) Prior Publication Data

US 2019/0225063 A1    Jul. 25, 2019

(30) Foreign Application Priority Data

Jan. 23, 2018   (KR) ......................... 10-2018-0008040

(51) Int. Cl.
| | | |
|---|---|---|
| *B60J 3/00* | (2006.01) | |
| *B60J 7/043* | (2006.01) | |
| *B60J 7/057* | (2006.01) | |
| *B60J 7/00* | (2006.01) | |
| *B60J 7/16* | (2006.01) | |

(52) U.S. Cl.
CPC ............. *B60J 7/0015* (2013.01); *B60J 7/043* (2013.01); *B60J 7/057* (2013.01); *B60J 7/1642* (2013.01)

(58) Field of Classification Search
CPC . B60J 7/0015; B60J 7/024; B60J 7/043; B60J 7/0435; B60J 7/057; B60J 7/0573; B60J 1/2044
USPC ................................................. 296/214, 223
See application file for complete search history.

(56) References Cited

U.S. PATENT DOCUMENTS

| | | | |
|---|---|---|---|
| 8,439,433 B2* | 5/2013 | Kim ...................... | B60J 7/0573 296/214 |
| 9,908,392 B1* | 3/2018 | Nania ........................ | B60J 7/11 |
| 10,408,303 B2* | 9/2019 | Jung ..................... | E05F 15/697 |
| 2014/0117725 A1* | 5/2014 | Rooijakkers ........... | B60J 7/0573 296/223 |
| 2014/0246884 A1* | 9/2014 | Nellen ..................... | B60J 7/047 296/217 |
| 2015/0028630 A1* | 1/2015 | Grimm .................. | B60J 7/0015 296/213 |
| 2018/0162207 A1* | 6/2018 | Pike ....................... | B60J 7/0015 |

* cited by examiner

*Primary Examiner* — Dennis H Pedder
(74) *Attorney, Agent, or Firm* — Morgan, Lewis & Bockius LLP

(57) ABSTRACT

A tilting sunroof structure may include a roll blind sled connected to a motor via a cable to slide in a longitudinal direction along a mechanism rail to open a roll blind, the mechanism rail being provided on an edge portion of a roof panel of a vehicle; a pushrod assembly allowing the roll blind sled to work in concert with a tilting sled located on the mechanism rail; and a timing assembly located on an end portion of the pushrod assembly to be selectively fastened to the roll blind sled to move the tilting sled, wherein the roll blind sled moves in a backward direction of the vehicle along the mechanism rail to be fastened to the timing assembly, and the roll blind sled fastened to the timing assembly moves further to tilt a sunroof window.

13 Claims, 3 Drawing Sheets

TILTING SUNROOF STRUCTURE

CROSS REFERENCE TO RELATED APPLICATION

The present application claims priority to Korean Patent Application No. 10-2018-0008040, filed Jan. 23, 2018, the entire contents of which is incorporated herein for all purposes by this reference.

BACKGROUND OF THE INVENTION

Field of the Invention

The present invention relates generally to a tilting sunroof structure and, more particularly, to a tilting sunroof structure in a sunroof system including a single motor, the tilting sunroof structure having a coupling structure able to open or close a roll blind while tilting a sunroof window.

Description of Related Art

A roof panel (or a ceiling) of a vehicle may be provided with an open area through which air is discharged from or introduced into a cabin. A sunroof window including a pane of glass is typically disposed in the open area such that the sunroof window may be opened.

That is, the roof panel is provided with a variety of frames, including a mechanism rail, such that the sunroof window is tilted upwards or downwards or slides forwards or backwards.

In a large number of sunroofs which are recently in use, a major portion of the roof panel is fabricated as a sunroof window to be selectively opened or closed for a sense of cool openness and superior aesthetic sensibility. A driver can receive sunlight more efficiently through such a sunroof.

Since the glass of the sunroof window may include a transparent material, a roll blind is provided below the sunroof window to be configured to slide in forward and backward directions of the vehicle, preventing sunlight from passing through the sunroof window.

The roll blind is used for a number of purposes, for example, to prevent a temperature rise in the cabin of the vehicle and to prevent glare to the driver. The roll blind is configured to be opened or closed as intended by a user.

However, in sunroofs of the related art, two driving motors are used to drive the sunroof window and the roll blind, respectively, such that the sunroof window and the roll blind slide in forward and backward directions. This consequently may increase the fabrication cost and weight of vehicles.

Furthermore, the provision of two driving motors requires an excessive portion of the thickness of a head lining, causing a rear headroom to be frail.

Furthermore, although a method of only driving the sunroof using a driving motor while manually sliding the roll blind is used, the present method may disadvantageously reduce the convenience of consumers.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a tilting sunroof structure able to open or close a roll blind while tilting a sunroof window using a single motor.

Also provided is a tilting sunroof structure including a fastening relation between components for tilting the sunroof window and components for performing longitudinal movements to open or close the roll blind.

The technical solutions of the present invention are not limited to the foregoing solutions, and other solutions that have not been stated will be apparent to a person skilled in the art from the following description. The technical solutions of the present invention may be realized by components included in the appended Claims and the equivalents thereof.

According to various aspects of the present invention, the tilting sunroof structure may include the following configurations:

Various aspects of the present invention are directed to providing a tilting sunroof structure including: a roll blind sled connected to a motor via a cable to slide in a longitudinal direction along a mechanism rail to open a roll blind, the mechanism rail being provided on an edge portion of a roof panel of a vehicle; a pushrod assembly allowing the roll blind sled to work in concert with a tilting sled located on the mechanism rail; and a timing assembly located on a rear end portion of the pushrod assembly to be selectively fastened to the roll blind sled to move the tilting sled, wherein the roll blind sled moves in a backward direction of the vehicle along the mechanism rail to be fastened to the timing assembly, and the roll blind sled fastened to the timing assembly moves further to tilt a sunroof window.

The timing assembly may include: a timing lever configured to face the roll blind sled; a winding guide guiding the roll blind sled, to which the timing assembly is fastened, and the timing lever to move in a longitudinal direction thereof; and a timing spring providing a predetermined level of tension to the timing lever.

The tilting sunroof structure may further include a protrusion located on a top surface of the roll blind sled.

The protrusion, located on the top surface of the roll blind sled, may move along a recess, located in a bottom surface of the timing lever, to be fastened to the timing assembly.

The pushrod assembly may include: a pushrod connecting the tilting sled and the timing assembly; and a pushrod sled located on a rear end portion of the pushrod to be fixed to the timing assembly.

The roll blind sled may be configured to move along a recess, located in a bottom surface of the timing lever, so that the pushrod sled and the timing assembly are fixed.

The timing lever may be configured to move in a longitudinal direction of the vehicle along the winding guide located on the mechanism rail.

The tilting sled may be configured to come into contact with a rear end portion of a carriage located on an edge portion of the sunroof window when the roll blind sled and the timing assembly, fastened to each other, move in a backward direction thereof.

The tilting sunroof structure may further include a shock absorbing portion located on one end portion of a carriage facing the tilting sled in a response to the sunroof window being tilted.

The tilting sunroof structure may further include a stopper located on the mechanism rail and in front of the tilting sled.

The present invention can realize the following effects according to the above-described embodiments, as well as configurations and the coupling and use relationships thereof that will be described below.

Various aspects of the present invention are directed to providing a sunroof configuration having high manipulation efficiency, since the sunroof configuration can open or close a roll blind while tilting a sunroof window using a single motor.

Furthermore, the present invention can reduce the number of components used in the tilting sunroof, improving productivity and economic competitiveness.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
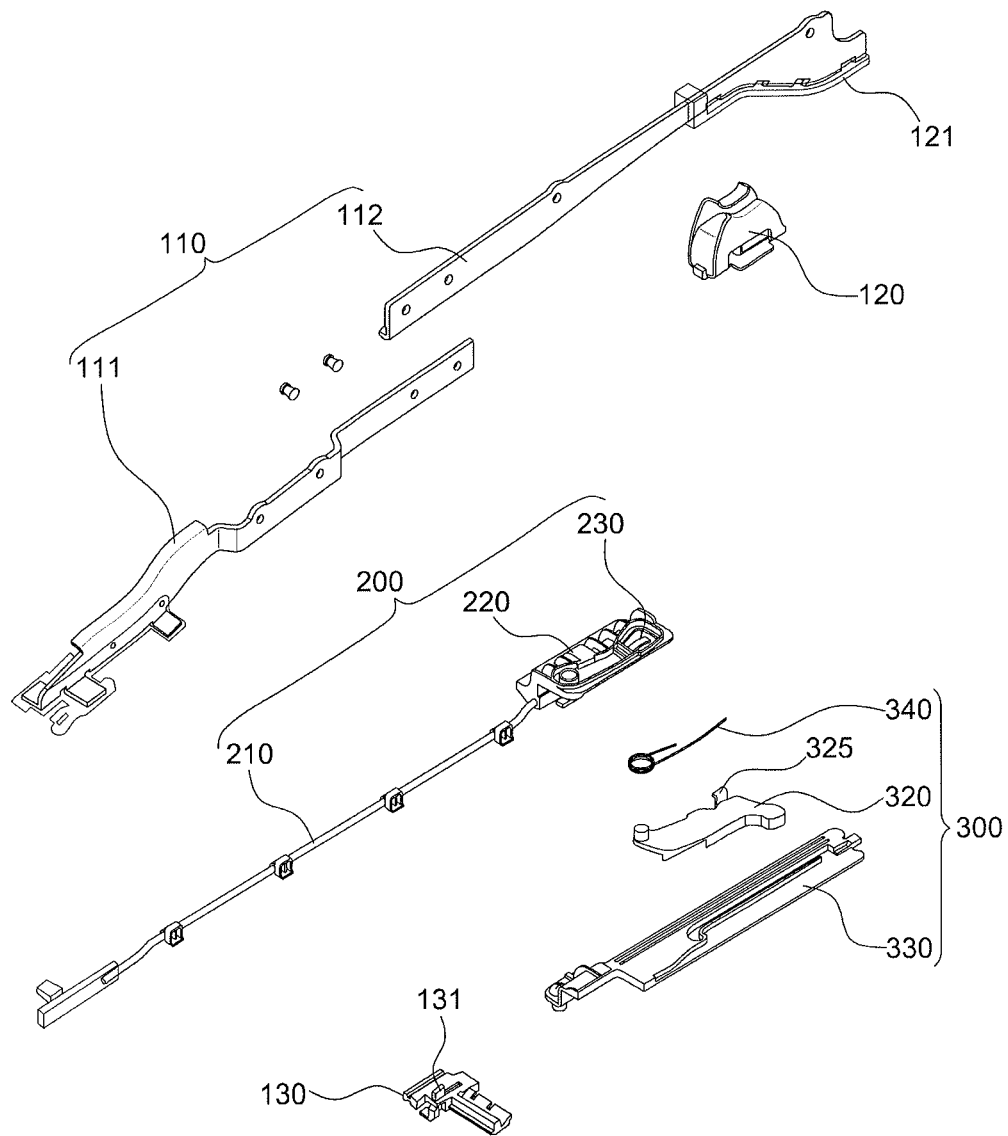
FIG. 1 is an exploded perspective view illustrating the configuration of a tilting sunroof structure.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

The present invention now will be described more fully hereinafter with reference to the accompanying drawings, in which exemplary embodiments of the present invention are shown. The present invention may, however, be embodied in various forms and may not be construed to be limited to the exemplary embodiments set forth herein. Rather, these embodiments are provided so that the present disclosure will be thorough and complete, and will fully convey the scope of the present invention to a person skilled in the art.

Terms, such as "assembly", "portion", and "lever", used herein indicate devices each of which performs at least one function or operation, and each of which may be provided by a set of hardware or a combination of sets of hardware.

FIG. 1 illustrates the configuration of a tilting sunroof structure 100. As illustrated in the drawings, a mechanism rail 400 is provided on an edge portion of a roof panel of a vehicle, in the longitudinal direction of the vehicle. Although a single carriage 110 is illustrated, two carriages may be provided on both edge portions of the roof panel. The mechanism rail 400 is configured such that a sunroof window 500 including a pane of glass is accommodated thereon. A roll blind sled 130 is fastened to a roll blind on the mechanism rail 400 and is configured to open or close the roll blind.

The roll blind sled 130 is connected to a motor, located in the vehicle body, via a cable to be movable in the longitudinal direction of the vehicle. In a response to driving force applied by the motor, the roll blind sled 130 moves the roll blind in the longitudinal direction thereof.

The roll blind sled 130 is configured to move in a backward direction of the vehicle to be fastened with a timing assembly 300. Both the roll blind sled 130 and the timing assembly 300, fastened with each other, move further in the longitudinal direction of the vehicle.

One end portion of the timing assembly 300 is configured to be coupled to a pushrod assembly 200. The pushrod assembly 200 includes a pushrod 210 extending in a longitudinal direction and a pushrod sled 220 provided on the rear end portion of the pushrod 210, the pushrod sled 220 being configured to face the timing assembly 300.

A front end portion of the pushrod assembly 200 is configured to be connected to the tilting sled 120 to form a rigid body. The pushrod 210 is located between the tilting sled 120 and the pushrod sled 220 to move along the mechanism rail 400 while maintaining the distance between the tilting sled 120 and the pushrod sled 220.

As the timing assembly 300 connected to the pushrod 210 to form a rigid body is moved in a backward direction of the vehicle due to fastening with the roll blind sled 130, the tilting sled 120 is simultaneously moved to lift one end portion of a carriage 110, which is located on an edge portion of the sunroof window 500, such that the sunroof window 500 is tilted.

According to the illustrated exemplary embodiment, the carriage 110 may include a front carriage 111 and a rear carriage 112 coupled to each other.

The roll blind sled 130 is fastened to the timing assembly 300 to provide a driving force by which the tilting sled 120 is moved to lift one end portion of the carriage 110. The roll blind sled 130 performs further movement in a backward direction of the vehicle. Accordingly, the tilting sled 120, fixed by the pushrod 210, is configured to work in concert with the timing assembly 300. A shock absorbing portion 121, located on the rear end portion of the carriage 110, is located to face the tilting sled 120.

The tilting sled 120 includes a stopper 410 located on the mechanism rail 400, the stopper 410 allowing the tilting sled 120 to move a predetermined distance in the longitudinal direction on the mechanism rail 400. Accordingly, a distance that the tilting sled 120 can move is limited by the position of the stopper 410 on the mechanism rail 400. A maximum distance that the timing assembly 300, fastened to the tilting sled 120 via the pushrod 210, can move forwards is also determined by the position of the stopper 410.

The timing assembly 300 includes a timing lever 320 configured to be fastened to the roll blind sled 130, a winding guide 330 allowing the roll blind sled 130 to be coupled to the timing lever 320 and additionally move, and a timing spring 340 providing a predetermined level of tension to the timing lever 320 such that the roll blind sled 130 and the timing lever 320 are fixed.

In an exemplary embodiment of the presently claimed invention, an end portion 322 of the timing lever 320 is pivotally coupled to the pushrod sled 220. The timing lever 320 further includes a coupling protrusion 325 protruding through a coupling groove 230 of the pushrod sled 220 and engaged to the timing spring 340.

A protrusion 131 is provided on the top surface of the roll blind sled 130, and a recess 321 is provided in the bottom surface of the timing lever 320. The recess 321 is configured such that the protrusion 131 is fitted into the recess 321 to move the timing lever 320. When the timing spring 340 is compressed in a response to the roll blind sled 130 moving along the mechanism rail 400, causing the roll blind sled 130, fastened to the timing lever 320, to move forwards, the present configuration maintains elastic force for decoupling the timing lever 320 and the roll blind sled 130.

Figure 2:
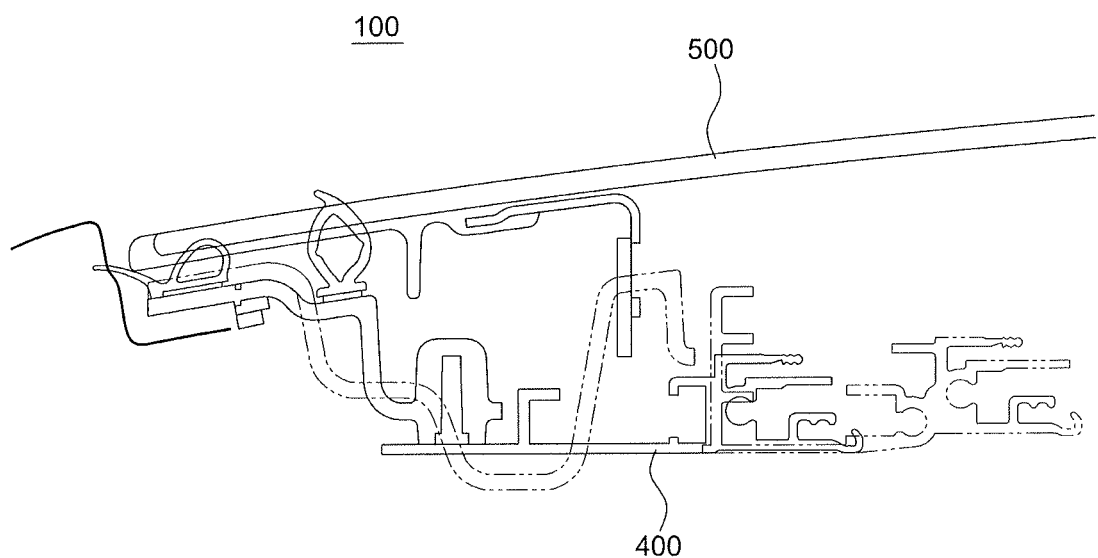
FIG. 2 is a cross-sectional view illustrating a sunroof on which the tilting sunroof structure is disposed.

FIG. 2 is a cross-sectional view illustrating the sunroof on which the tilting sunroof structure is disposed. As illustrated in the drawings, components, including a seal, a weather strap, and a glass support, for supporting the sunroof window 500, are located on the rear surface of the sunroof window 500 made of tempered glass, sequentially from the outside to the inside of the vehicle.

A vehicle frame, including the mechanism rail 400, is also provided, such that the components, including the seal, the weather strap, and the glass support, are located on the vehicle frame.

The mechanism rail 400 may include a plurality of rails. The roll blind sled 130 is movable on a rail in an internal portion of the mechanism rail 400, and the timing lever 320 is located outside of the rail, on which the roll blind sled 130 moves, to be fastened to the roll blind sled 130.

The tilting sled 120, connected to the timing lever 320 to form a rigid body, may be located on the same rail as the timing lever 320, or may be located on another rail, on which the tilting sled 120 moves by rigid body connection.

According to an exemplary embodiment of the present invention, the timing lever 320 and the tilting sled 120 may be configured to be located on the same rail of the mechanism rail 400. The winding guide 330, guiding the timing lever 330 and the roll blind sled 130 to move, may include at least one rail.

Figure 3:
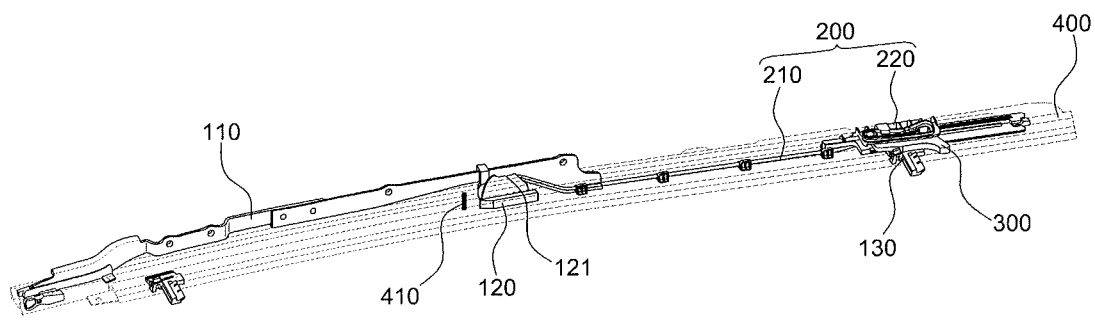
FIG. 3 is an assembly view illustrating the mechanism rail of the sunroof on which tilting sunroof structure is disposed.

FIG. 3 illustrates a path along which the roll blind sled 130 moves on the mechanism rail 400 before being fastened to the timing assembly 300.

As illustrated in the drawings, the roll blind sled 130 is configured to independently move before being fastened to the timing assembly 300. The roll blind sled 130 is configured to open or close the roll blind fixed within the roll blind sled 130.

The roll blind sled 130 is connected to a motor via a cable located in the internal of the vehicle to be supplied with driving force from the motor. The roll blind sled 130 only moves the roll blind before being fastened to the timing assembly 300 located in a rear portion of the vehicle.

When the roll blind is opened by having moved a predetermined distance or more in a backward direction of the vehicle, the roll blind sled 130 faces the timing assembly 300.

Figure 4:
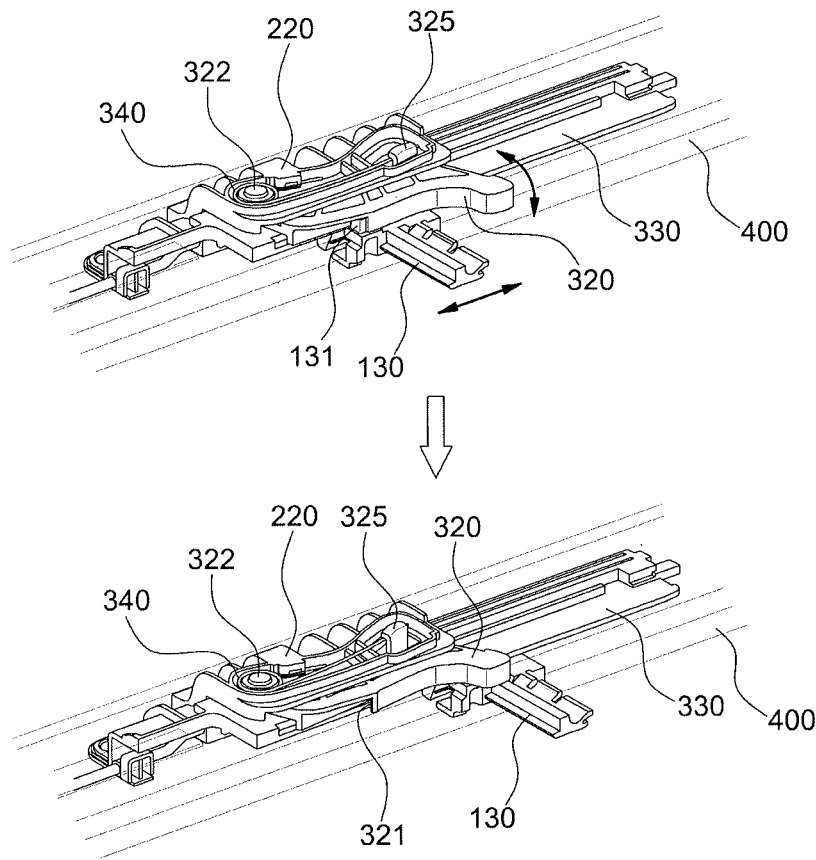
FIG. 4 is a perspective view illustrating a process of assembling the tilting sunroof structure.

FIG. 4 is an enlarged view illustrating a process in which the roll blind sled 130 is fastened to the timing lever 320 including a coupling protrusion 325.

The protrusion 131 is provided on the top surface of the roll blind sled 130, and the recess 321 is provided in the bottom surface of the timing lever 320 to conform to the protrusion 131.

When the roll blind sled 130 faces the timing assembly 300, the coupling protrusion 325 is coupled to the coupling groove 230 by the timing spring 340, as shown in FIG. 4.

When the roll blind sled 130 faces the timing assembly 300 and is moved further in a backward direction of the vehicle, the protrusion 131 moves following the recess 321.

The recess 321 is illustrated as having a predetermined curvature along the internal portion of the vehicle. In a response to the roll blind sled 130 moving in a backward direction of the vehicle, the timing lever 320 pivots in an outward direction of the vehicle, so that the timing spring 340 is compressed by the coupling protrusion 325 of the timing lever 320.

As the timing lever 320 is coupled to the roll blind sled 130, the timing lever 320 pivots in an outward direction of the vehicle about the end portion 322 thereof, and the timing spring 340, located outward of the timing lever 320, is compressed by the coupling protrusion 325. This consequently provides coupling force between the timing lever 320 and the roll blind sled 130.

More specifically, the timing spring 340 is coupled to one end portion 322 of the timing lever 320. Another end portion of the timing lever 320, pivotable in an outward direction of the vehicle, is configured to be fixed to the coupling groove 230 of the pushrod sled 220. The timing lever 320 and the pushrod sled 220 are configured to be fixed by the movement of the roll blind sled 130.

When the roll blind sled 130, fastened to the timing lever 320, moves further in a backward direction of the vehicle along the winding guide 330, the tilting sled 120, connected to the pushrod sled 220 via the pushrod 210, is caused to operate in concert with the roll blind sled 130, lifting one end portion of the carriage 110, provided on an edge portion of the sunroof window 500.

In contrast, when the roll blind sled 130 moves in a forward direction of the vehicle, the coupling protrusion 325 of the timing lever 320, to which elastic force is applied by the timing spring 340, is released from the coupling groove 230 of the pushrod sled 220 while the protrusion 131 of the roll blind sled 130 moves along the recess 321, so that the timing lever 320 and the roll blind sled 130 are decoupled.

Figure 5:
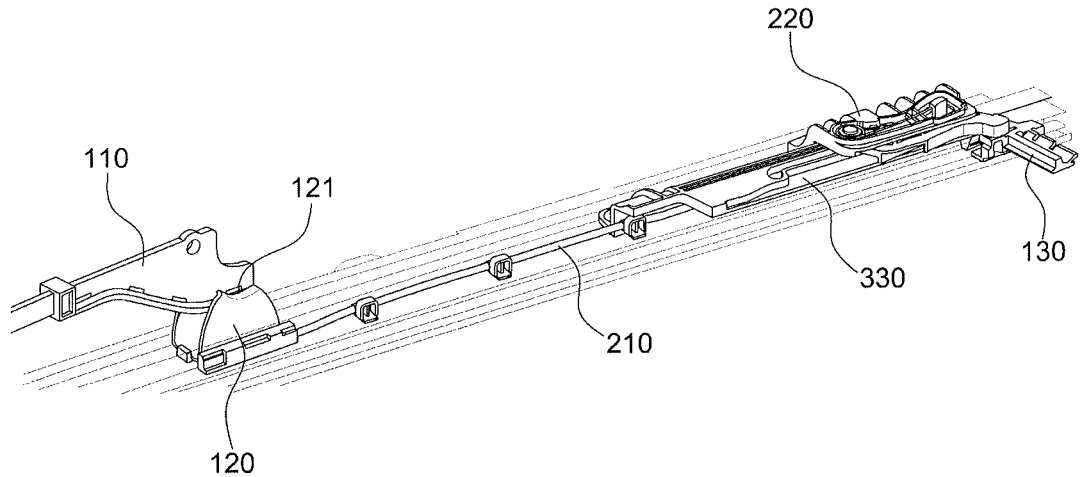
FIG. 5 is a perspective view illustrating the tilting sunroof structure in which the sunroof is tilted.

FIG. 5 illustrates a tilting sunroof structure according to an exemplary embodiment of the present invention, in which the sunroof window 500 is tilted in a response to the roll blind sled 130 having moved to an allowed rearmost position thereof in the vehicle.

The protrusion 131, located on the top surface of the roll blind sled 130, moves along the recess 321 of the timing lever 320 to be fastened to the timing lever 320 and the pushrod sled 220.

When the roll blind sled 130, fastened to the timing assembly 300, moves in a backward direction of the vehicle along the winding guide 330, the tilting sled 120, working in concert with the pushrod sled 220, moves the same distance as the roll blind sled 130, facing the bottom surface of the carriage 110.

The tilting sled 120 is configured to move horizontally along the shape of the bottom surface of the carriage 110. The tilting sled 120 performs supporting the rear surface of the tilted sunroof window 500, due to the bottom surface of the carriage 110 being shaped to be lifted.

The shock absorbing portion 121 is provided on the bottom surface of the carriage 110 facing the tilting sled 120.

The shock absorbing portion 121 may include polyurethane (PU) to have a physical property for reducing the vibration and noise of the tilted sunroof window 500. The shock absorbing portion 121 may also include any material configured for absorbing shock.

Accordingly, as illustrated in FIG. 5, the tilting sunroof structure 100 according to an exemplary embodiment of in various aspects of the present invention, the roll blind sled 130 is located at the rearmost end portion of the mechanism rail 400, and that the tilting sled 120, fixed by the pushrod 210 to work in concert with the pushrod sled 220, lifts the distal end portion of the carriage 110.

As set forth above, various aspects of the present invention are directed to providing the tilting sunroof structure 100 able to perform opening the roll blind and the tilting function using a single motor configured to drive the roll blind sled 130.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tilting sunroof structure comprising:
    a roll blind sled mounted in a mechanism rail and slidable in a longitudinal direction along the mechanism rail so as to open a roll blind;
    a pushrod assembly engaged to the mechanism rail and allowing the roll blind sled to work in concert with a tilting sled located on the mechanism rail; and
    a timing assembly located on an end portion of the pushrod assembly to be selectively fastened to the roll blind sled to move the tilting sled,
    wherein the roll blind sled moves in a predetermined direction of the vehicle along the mechanism rail to be fastened to the timing assembly, and the roll blind sled fastened to the timing assembly moves to tilt a sunroof window.

2. The tilting sunroof structure according to claim 1, wherein the timing assembly includes:
    a timing lever configured to face the roll blind sled;
    a winding guide guiding the roll blind sled and the timing lever to move in a longitudinal direction of the mechanism rail, wherein the timing assembly is coupled to the roll blind sled; and
    a timing elastic member providing a predetermined level of tension to the timing lever.

3. The tilting sunroof structure according to claim 1, further including a protrusion located on a top surface of the roll blind sled.

4. The tilting sunroof structure according to claim 3, wherein the protrusion, located on the top surface of the roll blind sled, moves along a recess, located in a bottom surface of the timing lever, to be fastened to the timing assembly.

5. The tilting sunroof structure according to claim 1, wherein the pushrod assembly includes:
    a pushrod connecting the tilting sled and the timing assembly; and
    a pushrod sled located on a rear end portion of the pushrod to be fixed to the timing assembly.

6. The tilting sunroof structure according to claim 5, wherein the timing assembly includes:
    a timing lever configured to face the roll blind sled;
    a winding guide guiding the roll blind sled and the timing lever to move in a longitudinal direction of the mechanism rail, wherein the timing assembly is fastened to the roll blind sled; and
    a timing elastic member providing a predetermined level of tension to the timing lever.

7. The tilting sunroof structure according to claim 6, wherein a first end of the timing lever is pivotally connected to the pushrod sled and a second end of the timing lever includes a coupling protrusion protruding through a coupling groove of the pushrod sled and elastically biased by the timing elastic member.

8. The tilting sunroof structure according to claim 7, wherein a protrusion of the roll blind sled is configured to move along a recess located in a bottom surface of the timing lever, so that the coupling protrusion of the timing lever is selectively coupled to the coupling groove of the pushrod sled according to movement of the protrusion of the roll blind sled.

9. The tilting sunroof structure according to claim 2, wherein the timing lever is configured to move in a longitudinal direction of the vehicle along the winding guide located on the mechanism rail.

10. The tilting sunroof structure according to claim 1, wherein the tilting sled is configured to contact with a rear end portion of a carriage located on an edge portion of the sunroof window when the roll blind sled and the timing assembly, fastened to each other, move in a predetermined direction thereof.

11. The tilting sunroof structure according to claim 10, further including a shock absorbing portion located on an end portion of the carriage facing the tilting sled in a response to the sunroof window being tilted.

12. The tilting sunroof structure according to claim 1, further including a stopper located on the mechanism rail and in a front of the tilting sled.

13. The tilting sunroof structure according to claim 1, wherein the mechanism rail is provided on an edge portion of a roof panel of a vehicle.

* * * * *